# 2,753,255

METHOD FOR PRODUCING POWDERS OF METALS AND METAL HYDRIDES

Peter P. Alexander, Beverly, and Robert C. Wade, Ipswich, Mass., assignors to Metal Hydrides Incorporated, Beverly, Mass., a corporation of Massachusetts No Drawing. Application December 14, 1953, Serial No. 398,223

15 Claims. (Cl. 75—84.1)

This invention relates to the production of a powder of a metal of high purity or its corresponding hydride by reduction of its halide with an alkaline earth metal hydride, such as calcium hydride. More particularly, the invention relates to the production of a powder of a metal or the corresponding hydride of a hydride-forming metal of the fourth, fifth or sixth group of the periodic table of elements by the reduction of the halide of such metal.

The copending application of Robert C. Wade and Peter P. Alexander, Serial No. 383,910, filed October 2, 1953, now Letters Patent No. 2,702,740, dated February 22, 1955, describes a method for producing an alkaline earth metal hydride by reaction of the corresponding halide with sodium hydride. The reaction is illustrated by the following equation:

(1)     $CaCl_2 + 2NaH \rightarrow CaH_2 + 2NaCl$

If desired, an excess of sodium hydride may be used to assure complete conversion of the calcium halide to calcium hydride and is found in the reaction mixture as sodium metal. In such case, the reaction mixture consists essentially of calcium hydride and sodium halide together with the sodium metal derived from the excess sodium hydride used.

In accordance with one phase of the present invention, a halide of a metal is reacted with a slight excess of the above reaction mixture. An amount of the above reaction mixture to provide an amount of calcium hydride of about 5 to 15 per cent by weight in excess of that theoretically required to reduce the metal halide completely is suitable. For example, zirconium tetrachloride may be heated in a confined reaction zone in the presence of a gas, such as hydrogen or argon under a pressure slightly greater than atmospheric pressure, with an excess of the above mentioned reaction mixture at a temperature between about 100° C. and 400° C. to form, with evolution of hydrogen, a solid reaction product consisting essentially of zirconium hydride and a mixture of calcium chloride and sodium chloride together with the excess calcium hydride used and any sodium metal that might have been present in the reactants. The reaction is illustrated by the following equation:

(2)     $2(CaH_2.2NaCl) + ZrCl_4 \rightarrow$
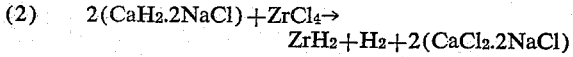
$ZrH_2 + H_2 + 2(CaCl_2.2NaCl)$ The second phase of the present invention utilizes the excess calcium hydride present in the reaction product of the first phase to react with oxygen compounds present to form inert calcium oxide and thus assure high purity of the metal or metal hydride desired. Thus, in accordance with the second phase, the reaction product of the first phase is heated in a confined reaction zone in the presence of a gas, such as hydrogen or argon, under a pressure slightly greater than atmospheric pressure at a temperature and period of time sufficient to cause the calcium hydride to react with oxygen compounds present and be converted to inert calcium oxide, such for example as for thirty minutes at a temperature between 800° C. and 900° C.

The third phase of the invention comprises heating the reaction product of the second phase under a reduced pressure at a temperature between about 800° C. and 900° C. for a period of time sufficient to degas and increase the particle size of the metal powder produced. The metal powder then may be separated from the salt mixture in any conventional manner, such as by dissolving out the salts.

It will be noted that the reaction product of the first phase of the invention, as illustrated by Equation 1 above, contains the excess calcium hydride used together with zirconium hydride and a mixture of calcium halide and sodium halide. When an anhydrous mixture of sodium and calcium halides and calcium metal is fused, a reaction can take place between the calcium metal and the sodium halide to produce sodium metal. This reaction, however, is not complete and reaches an equilibrium in the presence of certain relative proportions of sodium and calcium halides and also reaches an equilibrium in the presence of certain relative proportions of sodium and calcium metals.

The present invention takes advantage of the fact that the relative proportions of calcium and sodium halides in the reaction product of the first phase of the invention, as illustrated by Equation 2 above, are close to those required to bring about the above mentioned equilibrium. Consequently, only a small amount of calcium hydride reacts with the sodium halide present to form sodium metal and establish this equilibrium.

However, if the second phase of the invention were omitted and the reaction product of the first phase were heated under reduced pressure, the sodium metal formed would immediately be removed and upset such equilibrium and thus permit more calcium hydride to react with the sodium halide. This reaction would continue with continued removal of sodium metal. As a result, the calcium hydride would not be available for effective reaction with oxygen compounds present. Consequently, in accordance with the present invention, the reaction product of the first phase, as illustrated by Equation 2 above, is heated under slight gas pressure in accordance with the second phase of the invention. As a result, only a small amount of the excess calcium hydride is utilized to react with the sodium halide and establish the above mentioned equilibrium and the remaining portion of calcium hydride is available for reaction with oxygen compounds present and assure high purity of the metal to be produced.

The reaction of the first phase of the invention reduces the halide of the desired metal to the hydride thereof in the presence of a gas under slight pressure. The second phase of the invention effects a reaction between the calcium hydride and any oxygen compounds present and is conducted in the presence of a gas under pressure and some hydrogen may be evolved. Consequently, within the spirit of the invention, it is immaterial whether the gas used in the first and second phases of the invention is hydrogen or a monatomic gas, such as argon, since either is substantially inert. Therefore, in the appended claims, the expression "an inert atmosphere" is not intended to exclude hydrogen.

Illustrative of the halides which may be used in the practice of the invention are uranium tetrabromide, uranium tetrachloride and pentachloride, uranium tetrafluoride and hexafluoride, tungsten pentabromide, tungsten pentachloride and hexachloride, titanium tetrabromide, titanium tetrachloride, titanium tetrafluoride, titanium tetraiodide, zirconium tetrachloride, vanadium tetrachloride, vanadium pentafluoride, thorium tetrabromide, tantalum pentafluoride, tantalum pentachloride, tantalum pentabromide, columbium pentabromide, columbium pentachloride, columbium pentafluoride, etc.

In the practice of the first phase of the invention, the metal halide first may be intimately blended, as by mixing, with the mixture of alkaline earth metal hydride and sodium halide produced as illustrated by Equation 1 above. This is a somewhat difficult and expensive procedure. Since most of the halides of the metals to which the invention is particularly directed either boil or sublime at a low temperature, we prefer to place such halides in the bottom of the reaction chamber and then place thereon the mixture of calcium hydride and sodium halide. The reaction chamber should be evacuated to remove air and moisture and then filled with a gas, such as hydrogen, or a monatomic gas, such as argon, under a pressure slightly greater than atmospheric pressure. Then as the temperature of the reaction chamber is raised, the vapors of the halide come in intimate contact with the calcium hydride and react therewith to form the corresponding metal or metal hydride and the halide of calcium. Illustrative examples of halides which sublime or boil at low temperature are the tetrachlorides of zirconium, vanadium, uranium and titanium and the pentachlorides of tantalum, tungsten, molybdenum and columbium. Unless the halides which boil or sublime at a low temperature are intimately blended with the calcium hydride mixture the temperatures used must be at least as high as their boiling or sublimation temperature. In any event the temperature used should be less than the fusion temperature of the salt mixture formed. When the reactants are intimately blended, the reaction takes place at temperatures between about 100° C. and 400° C.

The second phase of the invention then may be effected in the same reaction chamber merely by raising the temperature of the reaction mass above the fusion temperature of the salt mixture to between about 800° C. and 900° C. and maintaining such temperature for a sufficient period to effect reduction of oxygen compounds present, namely, for about one half hour. A temperature as high as about 1050° C. may be used but is not necessary. The third phase of the invention then may be effected merely by subjecting the reaction chamber to a reduced pressure and continuing the heating for a sufficient period of time to degas the metal powder and increase its particle size as desired.

It will be apparent from the above that the present invention provides a novel method for producing powders of metals, such as titanium, zirconium, vanadium and uranium, etc., of extremely high purity which therefore had been obtained in high purity only with great difficulty and expense. Furthermore, this can be accomplished by the invention with impure reactions, such as tetrachlorides of zirconium and titanium.

If desired, the reaction mixture of calcium hydride and sodium halide may be formed in situ in accordance with Equation 1 above. Thus, a suitable amount of a mixture of sodium hydride and calcium halide in proportions illustrated by Equation 1 above may be placed in a confined reaction zone upon, for example, zirconium tetrachloride and, after evacuation to remove air and moisture, may be heated under a slight pressure of hydrogen to effect formation of calcium hydride and the reaction of the latter with the zirconium tetrachloride. The temperature then may be raised to between about 800° C. to 900° C. to fuse the mixture of halides of calcium and sodium and cause the excess calcium hydride to combine with any oxygen compounds present. The reaction zone then may be subjected to vacuum while heating is continued to degas the reduction product, e. g. zirconium hydride, and increase the particle size of the zirconium metal produced.

The invention is further illustrated by the following specific example:

117 grams of zirconium tetrachloride were mixed under argon with 173 grams of the product resulting from the reaction illustrated by Equation 1 above (containing about 25% calcium hydride and 75% sodium chloride). This mixture was charged to a stainless steel liner which was inserted in a stainless steel retort. The system was evacuated, filled with hydrogen at one atmosphere pressure, and heated. The reaction began at 140° C. and the temperature carried to 470° C. Some sublimation of zirconium tetrachloride was found to occur. Heating was continued under hydrogen to 900° C. and held at this temperature for 30 minutes. Vacuum was then applied until no more hydrogen was evolved. The total time for reduction and degassing was 205 minutes. The retort and contents were cooled under vacuum. When completely cooled, the liner was removed from the retort and the salt-zirconium mixture was chipped out. It was leached first with slightly acidified water until free of calcium and then was washed with water until free of chlorides. The finely divided material was black in color and a rough separation of this material was made by decantation from the coarser material. Thirty-eight grams of zirconium was obtained representing a yield of 83.5 per cent. The zirconium analyzed 99.3 per cent zirconium, 0.17 per cent carbon and 0.11 per cent hydrogen. 5.5 grams of the finely divided material was obtained or 12.1 per cent of the total metal product.

We claim:

1. The method for reducing a halide of a hydride-forming metal selected from the group consisting of uranium, tungsten, titanium, zirconium, vanadium, thorium, and columbium which comprises reacting said halide with calcium hydride by heating said halide in an inert atmosphere under a pressure slightly greater than atmospheric pressure with a mixture comprising essentially one mole of calcium hydride and two moles of a halide of sodium until said metal halide has been substantially completely reduced and a reaction product is formed comprising the reduction product of said metal halide and calcium hydride together with a mixture of halides of calcium and sodium, the amount of said mixture being such as to provide an amount of calcium hydride of about 5 to 15 percent by weight in excess of that theoretically required to reduce said halide to metal, said heating being between about 100° C. and the fusion temperature of said halide mixture, and heating said reaction product in an inert atmosphere under a pressure slightly greater than atmospheric pressure above the fusion temperature of said halide mixture at a temperature and for a period of time sufficient to permit the calcium hydride to react with oxygen compounds present and form inert calcium oxide.

2. The method for reducng a halide of a hydride-forming metal selected from the group consisting of uranium, tungsten, titanium, zirconium, vanadium, thorium, and columbium which comprises reacting said halide with calcium hydride by heating said halide in an inert atmosphere under a pressure slightly greater than atmospheric pressure with a mixture comprising essentially one mole of calcium hydride and two moles of a halide of sodium until said metal halide has been substantially completely reduced and a reaction product is formed comprising the reduction product of said metal halide and calcium hydride together with a mixture of halides of calcium and sodium, the amount of said mixture being such as to provide an amount of calcium hydride of about 5 to 15 percent by weight in excess of that theoretically required to reduce said halide to metal, said heating being between about 100° C. and the fusion temperature of said halide mixture, heating said reaction product in an inert atmosphere under a pressure slightly greater than atmospheric pressure above the fusion temperature of said halide mixture at a temperature and for a period of time sufficient to permit the calcium hydride to react with oxygen compounds present and form inert calcium oxide, and thereafter heatng said reaction product under a reduced pressure at a temperature of between about 800°

C. and 900° C. to increase the particle size of said reduction product.

3. The method for reducing a zirconium halide which comprises heating a zirconium halide in an inert atmosphere under a pressure slightly greater than atmospheric pressure with a mixture comprising essentially one mole of calcium hydride and two moles of a halide of sodium until said zirconium halide has been substantially completely reduced to zirconium hydride and a reaction product is formed comprising zirconium hydride and calcium hydride together with a mixture of halides of calcium and sodium, said heating being between about 100° C. and the fusion temperature of said halide mixture, the amount of said mixture being such as to provide an amount of calcium hydride of about 5 to 15 percent by weight in excess of that theoretically required to reduce said halide to metal, and heating said reaction product in an inert atmosphere under a pressure slightly greater than atmospheric pressure above the fusion temperature of said halide mixture at a temperature and for a period of time sufficient to permit the calcium hydride to react with oxygen compounds present and form inert calcum oxide.

4. The method described by claim 3 in which the zirconium halide is replaced by a titanium tetrahalide.

5. The method described by claim 3 in which the zirconium halide is replaced by a vanadium tetrahalide.

6. The method described by claim 3 in which the zirconium halide is replaced by a uranium tetrahalide.

7. The method described by claim 3 in which the zirconium halide is replaced by a tungsten pentahalide.

8. The method for reducing a zirconium halide which comprises heating a zirconium halide in an inert atmosphere under a pressure slightly greater than atmospheric pressure with a mixture comprising essentially one mole of calcium hydride and two moles of a halide of sodium until said zirconium halide has been substantially completely reduced to zirconium hydride and a reaction product is formed comprising zirconium hydride and calcium hydride together with a mixture of halides of calcium and sodium, the amount of said mixture being such as to provide an amount of calcium hydride of about 5 to 15 percent by weight in excess of that theoretically required to reduce said halide to metal, said heating being between about 100° C. and the fusion temperature of said halide mixture, heating said reaction product in an inert atmosphere under a pressure slightly greater than atmospheric pressure above the fusion temperature of said halide mixture at a temperature and for a period of time sufficient to permit the calcium hydride to react with oxygen compounds present and form inert calcium oxide, and thereafter heating said reaction product under a reduced pressure at a temperature of between about 800° C. and 900° C. to degas said zirconium hydride and increase the particle size of the resulting zirconium metal powder.

9. The method as described by claim 8 in which the zirconium halide is replaced by a titanium tetrahalide.

10. The method as described by claim 8 in which the zirconium halide is replaced by a vanadium tetrahalide.

11. The method as described by claim 8 in which the zirconium halide is replaced by a uranium tetrahalide.

12. The method as described by claim 8 in which the zirconium halide is replaced by a tungsten pentahalide.

13. The method for reducing a zirconium halide which comprises reacting a zirconium tetrahalide with calcium hydride by placing a mixture comprising essentially one mole of calcium hydride and two moles of a halide of sodium upon the zirconium tetrahalide in a confined reaction zone and heating in an inert atmosphere under a pressure slightly greater than atmospheric pressure until the zirconium tetrahalide has been substantially completely reduced to zirconium hydride and a reaction product is formed comprising zirconium hydride and calcium hydride together with a mixture of halides of calcium and sodium, the amount of said mixture being such as to provide an amount of calcium hydride of about 5 to 15 percent by weight in excess of that theoretically required to reduce said halide to metal, said heating being between 100° C. and the fusion temperature of said halide mixture, and heating said reaction product in an inert atmosphere under a pressure slightly greater than atmospheric pressure above the fusion temperature of said halide mixture at a temperature and for a period of time sufficient to permit the calcium hydride to react with oxygen compounds present and form inert calcium oxide.

14. The method as described by claim 13 in which the zirconium tetrahalide is replaced by a titanium tetrahalide.

15. The method as described by claim 13 in which the zirconium tetrahalide is replaced by vanadium tetrachloride.

References Cited in the file of this patent

UNITED STATES PATENTS

| | | |
|---|---|---|
| 1,573,083 | Marden et al. | Feb. 16, 1926 |
| 1,738,669 | Rich | Dec. 10, 1929 |
| 2,427,339 | Alexander | Sept. 16, 1947 |
| 2,546,320 | Rostron | Mar. 27, 1952 |
| 2,584,411 | Alexander | Feb. 5, 1952 |

FOREIGN PATENTS

| | | |
|---|---|---|
| 230,865 | Great Britain | Dec. 10, 1925 |
| 354,785 | Great Britain | Aug. 10, 1931 |
| 697,530 | Great Britain | Sept. 23, 1953 |
| 698,753 | Great Britain | Oct. 21, 1953 |

OTHER REFERENCES

Comprehensive Treatise on Inorganic and Theoretical Chemistry by Mellor, vol. 7, page 9. Published 1927 by Longmans, Green & Co., New York.

Chemical Abstracts, vol. 35, 1941, page 4712.

Metal Progress, February 1950, pages 257–158.